United States Patent [19]

Bertha et al.

[11] Patent Number: 4,770,700

[45] Date of Patent: Sep. 13, 1988

[54] HYDROMETALLURGICAL PROCESS FOR THE SEPARATION AND ENRICHMENT OF GOLD, PLATINUM, AND PALLADIUM, TOGETHER WITH RECOVERY OF SELENIUM, FROM THE ANODE SLUDGE OF COPPER ELECTROLYSIS

[75] Inventors: Josef Bertha; Jorg Wallner; Helmüt Wörz, all of Brixlegg, Austria

[73] Assignee: Austria Metal Aktiengesellschaft, Braunau am Inn, Austria

[21] Appl. No.: 270

[22] Filed: Dec. 24, 1986

[51] Int. Cl.$^4$ ............................................. C22B 11/04
[52] U.S. Cl. .................................... 75/101 R; 75/108; 75/109; 75/112; 75/114; 75/117; 75/118 R; 75/119; 75/120; 75/121; 423/22; 423/38; 423/39; 423/40; 423/42; 423/46; 423/508; 423/509; 423/510
[58] Field of Search ............... 75/97 A, 101 R, 108, 75/109, 111, 112, 114, 117, 118 R, 119, 120, 121; 423/22, 38, 39, 40, 42, 46, 92, 94, 103, 109, 163, 140, 150, 508, 509, 510

[56] References Cited

U.S. PATENT DOCUMENTS

| | | | |
|---|---|---|---|
| 712,640 | 11/1902 | Betts | 423/40 |
| 4,188,362 | 2/1980 | Edwards et al. | 423/22 |
| 4,397,689 | 8/1983 | Lea et al. | 423/22 |
| 4,615,731 | 10/1986 | Thomas et al. | 423/508 |
| 4,666,514 | 5/1987 | Bertha | 423/38 |

FOREIGN PATENT DOCUMENTS 0289750 10/1978 U.S.S.R. ............................. 423/508

Primary Examiner—Robert L. Stoll
Attorney, Agent, or Firm—Herbert Dubno

[57] ABSTRACT

A hydrometallurgical process for enrichment of gold, platinum and palladium from copper electrolysis anode sludge, and simultaneously recovery of selenium, in which the sludge is treated with $Cl_2$/HCl to transform the selenium of a hexavelent state and precipitate out silver chloride. The filtrate is then subjected to selective reduction of precipitate the noble metals and the resulting filtrate is chlorinated and a further reduction is effected to precipitate the metallic selenium.

9 Claims, 1 Drawing Sheet

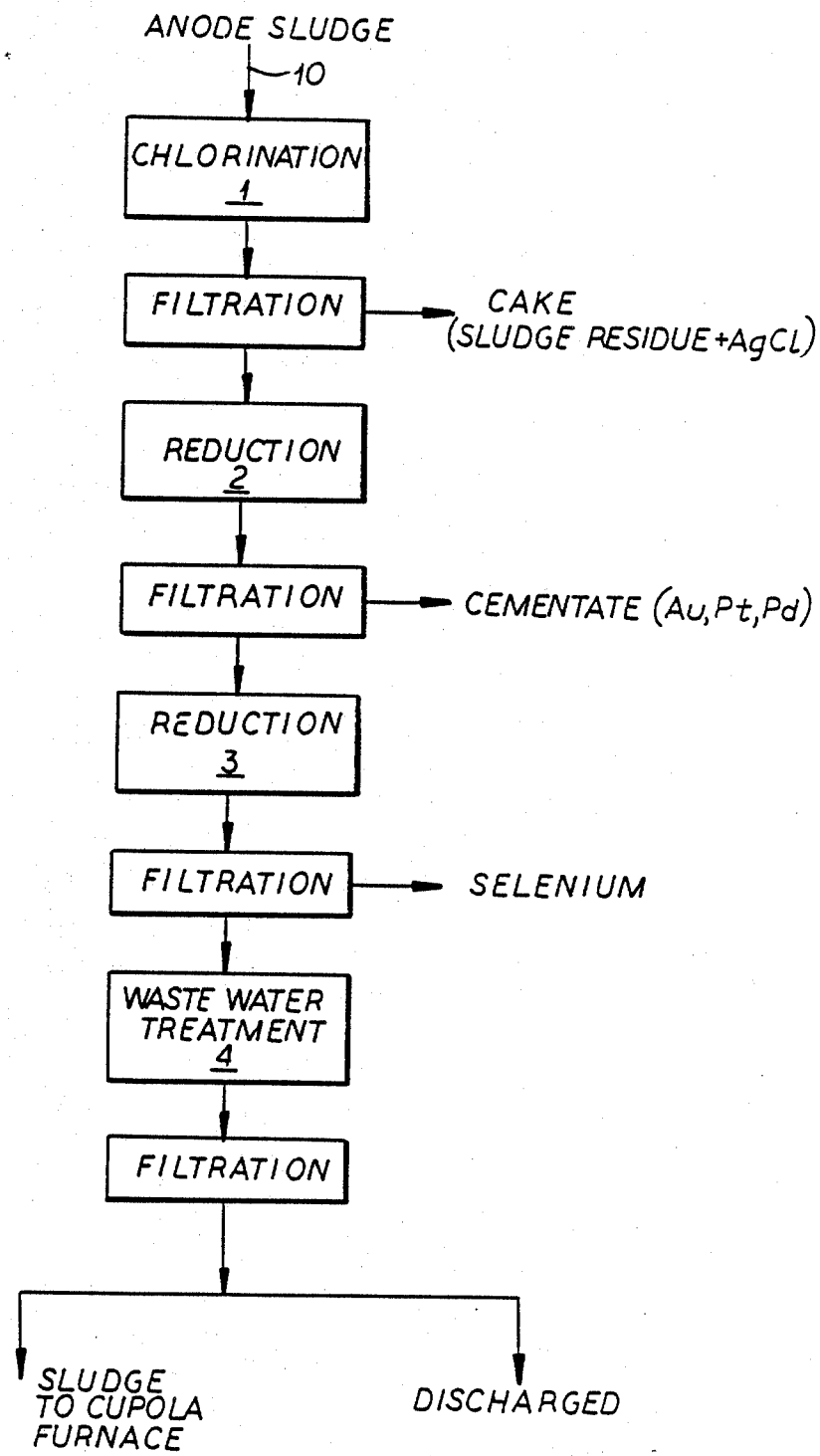

HYDROMETALLURGICAL PROCESS FOR THE SEPARATION AND ENRICHMENT OF GOLD, PLATINUM, AND PALLADIUM, TOGETHER WITH RECOVERY OF SELENIUM FROM THE ANODE SLUDGE OF COPPER ELECTROLYSIS

FIELD OF THE INVENTION

Our present invention relates to the treatment of the anode sludge produced in copper electrolysis and similar materials, e.g. nonmetallic materials or materials produced in the metallurgy of nonferrous metals, which contain gold, palladium, platinum and selenium. More particularly, the invention relates to a hydrometallurgical process for the separation and enrichment of gold, platinum and palladium and for the recovery of selenium from aqueous sludges, e.g. copper electrolysis anode sludge, which contain in addition to gold, platinum, palladium and selenium, such elements as silver, tellurium, antimony, tin, arsenic, bismuth, copper, nickel, zinc and iron and such anion as sulfate and chloride, as well as some insoluble compounds such as barium sulfate, and in many cases, a variety of silica-containing or siliceous compounds, including silicic acid, in addition to other platinum group metals present in small quantities.

The noble metals which are present and which will be treated together with platinum and palladium and will be understood to precipitate therewith, include small amounts of rhodium and ruthenium.

The principal purpose of the invention is to provide a process or method which permits the separation and enrichment of gold, platinum and palladium, and which also allows for recovery of selenium from such anode sludges.

BACKGROUND OF THE INVENTION

Prior art treatments for such anode sludges and the recovery of valuable metals therefrom have involved combinations of pyrometallurgical and hydrometallurgical steps.

The first process step is usually an oxidative roasting at 200° to 400° C., effected in a thin layer or a rotary drum-type furnace with air feed. The selenides and tellurides of copper and silver thus react to form selenites and tellurites. During this process small amounts of $SeO_2$ are volatilized.

Selenium and tellurium are extracted from the sludge by an alkali leaching and, selenium by reaction with $SO_2$ in acid solution, deposits as crude elemental selenium.

From the leaching residue, a so-called Doré metal, namely, a sludge-copper-gold alloy is recovered using a Doré furnace. This alloy is introduced into a silver electrolysis process. At the anode of the silver electrolysis, platinum metal and gold precipitate as an anode sludge. This sludge, after initial cleaning is smelted and cast into an anode from which the gold is electrochemically deposited while the platinum enriches the gold electrolyte and can be recovered therefrom by chemical processes.

This conventional process is very time-consuming and has a high consumption of energy because it requires furnace treatments and smelting. It also suffers from significant loss of noble metals and has some selenium losses which can give rise to environmental hazards.

The process is also dependent on the duration of gold electrolysis which, in the case of large gold quantities, is especially time-consuming and lengthy.

OBJECTS OF THE INVENTION

It is the principal object of the present invention to provide an improved process for the enrichment of gold, platinum and palladium, i.e. noble and platinum-group metals, and recovery of selenium from anode sludge of copper electrolysis and like materials whereby the aforementioned drawbacks are avoided and the process is both energy efficient and environmentally sound.

Another object of this invention is to provide a method of treating anode sludges and like materials to maximize the recovery of gold, palladium, platinum and other noble metals therefrom, obtain practically 100% selenium recovery and thus have high yields of these elements at low energy cost and expenditure for other materials such as treating chemicals.

SUMMARY OF THE INVENTION

The present invention thus is a hydrometallurgical process for the separation and enrichment of gold, platinum and palladium and for the recovery of selenium from the anode sludge of copper electrolysis which contains in addition to Au, Pt and Pd, and other platinum-group metals, Ag, Se and Te and which also can contain Sb, Sn, As, Bi, Cu, Ni, Zn, Fe, sulfate, chloride, $BaSO_4$, and siliceous compounds, the process comprising the steps of:

(a) chlorinating the sludge with $Cl_2/HCl$ to solubilize in an aqueous phase thereof substantially all of the gold, platinum, palladium and selenium of the sludge, and filtering the aqueous phase from silver-chloride containing solids of the sludge to recover a first filtrate therefrom;

(b) reacting the filtrate with an excess of chlorine gas at room temperature to transform the selenium solubilized in the filtrate as $Se^{+4}$ completely to $Se^{+6}$ and tellurium in the filtrate as $Te^{+4}$ to $Te^{+6}$;

(c) treating the filtrate resulting from step (b) with a reducing agent capable of precipitating out gold quantitatively and in the presence of a defined amount of $Se^{+4}$ quantitatively precipitating out platinum, palladium also being precipitated out by the reducing agent;

(d) filtering the precipitate resulting in step (c) from a second filtrate containing at least the major part of the selenium of the first filtrate;

(e) strongly heating the second filtrate in the presence of HCl and reacting the second filtrate with a reducing agent to quantitatively precipitate selenium; and (f) filtering the selenium-containing precipitate from the second filtrate reacted in step (e).

By the chlorination of the anode sludge with chlorine, hydrochloric acid or other chlorinating media, apart from copper and nickel, the platinum group metals, gold and selenium are quantitatively solubilized in the aqueous phase (step (a)). The residue after filtration (step (a)) contains all of the silver as silver chloride AgCl. From this filter residue, the silver can be recovered by any conventional pyrometallurgical or hydrometallurgical process which may be coupled to the process of the invention but is not necessarily a part thereof.

In the hydrochloric acid first filtrate of the chlorination step (step (a)), selenium and tellurium are also present and, according to the invention in step (b) this filtrate is reacted in an oxidation at room temperature with $Cl_2$ gas to oxidize the $Se^{IV}$ and $Te^{IV}$ compounds to form the hexavalent forms of the selenium and tellurium according to a reaction scheme of the following type:

$$2Se^{IV}O_3^{2-} + O_2 \underset{(Cl_2)}{\overset{\text{Normal temp.}}{\underset{\text{Heat}}{\rightleftarrows}}} 2Se^{VI}O_4^{2-} \quad (1)$$

The selective separation of the platinum group metals and gold from the selenium is then effected step (c) by reacting the filtrate treated in step (b) with an appropriate reducing agent, i.e. monovalent copper ion (i.e. $Cu^{+1}$) or a compound which can form it, such as the sodium or the potassium copper (I) chloride ($Me^I$($Cu^ICl_2$)) or copper or a substance which can form $Cu^{+1}$ such as bronze dust, CuCl or the like. The noble metals can be quantitatively precipitated in this manner at room temperature without significant reduction of the $Se^{VI}$ or the $Te^{VI}$.

The noble metals react as is represented by the following relations:

$$Au^{+++} + 3Cu^+ \rightarrow Au° + 3Cu^{++} \quad (2)$$

$$Pd^{++} + 2Cu^+ \rightarrow Pd° + 2Cu^{++} \quad (3)$$

$$Pt^{++} + 2Cu^+ \rightarrow Pt° + 2Cu^{++} \quad (4)$$

While the $Au^{+++}$ precipitates quantitatively upon the introduction of the reducing agent, for precipitation of the platinum group metals in the hydrometallurgic acid solution, a so-called collector is required. This collector can be a stoichiometric or defined quantity of $Se^{IV}$. This stoichiometric quantity of $Se^{IV}$ precipitates with the platinum group metals in the form of selenium and is an amount equal to the amount of platinum group metals in solution on a equimolar basis. In practice the $Se^{IV}$ only amounts to 1 to 2% of the total selenium contained in the anode sludge and thus is a small fraction of the selenium in the filtrate.

The addition of $Se^{IV}$ can be avoided if one uses the reverse reaction represented in equation 1, wherein heat is applied to reform the $Se^{IV}$ in a controlled amount stoichiometrically equivalent to the platinum group metals.

TABLE 1

| Composition of Noble Metal Precipitate (Example): | | |
|---|---|---|
| 40% A | 2.8% Pt | Remainder = Se |
| 25% Pd | 2.5% Cu | |

TABLE 2

| Analysis of the Anode Sludge Used (Example): | | |
|---|---|---|
| 4.52% Ag | 2.5% Se | 0.21% Te |
| 220 ppm Au | 2.8% Cu | |
| 138 ppm Pd | 1.8% Ni | |
| 15 ppm Pt | 35% Pb | |

The novel metal precipitate (cementate) which is formed can be worked up by conventional electrochemical or hydrometallurgical processes which, while they may be coupled with the process of the present invention, do not necessarily form a part thereof since the cementate itself provides the noble metals and gold in an enriched form.

In the second filtrate (step (d)) resulting from filtrating the cementate from the aqueous phase, most of the selenium as well as residues of copper and nickel are present together, of course, with tellurium.

In step (e) this second filtrate is strongly heated in the presence of hydrochloric acid and a reducing agent is supplied to transform the $Se^{VI}$ to $Se^{IV}$ and then reduce the latter to elemental selenium in accordance with, for example, reactions:

$$H_2Se^{VI}O_4 + 2HCl \xrightarrow{Heat} H_2Se^{VI}O_3 + H_2O + cl_2 \quad (5)$$

$$H_2Se^{VI}O_3 + 4Cu^{30}Cl + 4HCl \rightarrow Se + 3H_2O + 4\ CuCl_2 \quad (6)$$

Black crystalline selenium precipitate is filtered and dried (step (f)) and selenium with a purity of at least 99.5% is obtained with copper, lead, tellurium and traces of noble metals constituting the impurities, the filtrate after selenium precipitation can be treated with hydrated lime in a standard waste water treatment operation since the high $Cu^{++}/Cu^+$ ratio ensures that only insignificant traces of heavy metal ions will be present in the resulting waste water.

SPECIFIC EXAMPLE

Anode Sludge Composition: See Table 2

125 kg of this anode sludge with 20% water content, following treatment to remove copper (100 kg dry solids) is suspended in water and chlorinated at room temperature with $Cl_2/HCl$.

The silver chloride-containing residue is separated by filtration and after washing, 150 liters of filtrate (plus wash water) is obtained with the following composition:

HCl: ca. 30 g/l
Au: 147 ppm
Pd: 92 ppm
Pt: 10 ppm
Se: 16 g/l

The after chlorination of this solution to oxidize $Se^{IV}$ to $Se^{VI}$ is effected with stirring at room temperature.

To quantitatively precipitate the noble metals, the reducing agent (e.g. the $Me(CuCl_2)$, (where Me is Na or K, or bronze dust) is added in two parts.

One-third of the reducing agent is added immediately after chlorination to bind excess chlorine and precipitate most of the gold.

Thereafter a defined amount of $Se^{IV}$ solution produced by boiling two liters of the second filtrate is then added together with the balance of the reducing agent until the palladium content of the solution is reduced to a maximum of 0.5 ppm. This requires about 350 g of bronze dust (80% Cu, 20% Zn). After 10 minutes of standing, this cementate can be filtered off.

Composition of Cementate: See Table 1

To precipitate selenium from this second filtrate, the $Se^{VI}$ is reduced to $Se^{IV}$. This is effected by adding 10 liters of hydrochloric acid (specific gravity 1.18) and heating to about 80° to 80° C. The heating agent (see equation 6) is then added slowly and in one-half hour the selenium precipitates as a black crystalline deposit quantitatively. The consuming of reducing agent is 6.7 kg of the bronze dust. The selenium has a purity in excess of 99.5%.

BRIEF DESCRIPTION OF THE DRAWING

The above and other objects, features and advantages of the present invention will become more readily apparent from the following description, reference being made to the sole FIGURE of the accompanying drawing which is a flow diagram illustrating the process of the invention.

SPECIFIC DESCRIPTION

In the drawing we show a process in which the anode sludge is fed at 10 to the initial chlorination stage 1 from which filtration results in a filter cake containing sludge residue and recoverable silver chloride. The initial reduction step 2 forms, following illustration, the aforementioned cementate and the second filtrate which undergoes reduction at 3 to transform the $Se^{+6}$, initially to $Se^{+4}$ at high temperature and a HCl concentration above 40 g/l.

Following a further filtration from which the metallic selenium is recovered, the third filtrate undergoes waste water treatment at 4. The filtrate can be discharged while the sludge can be returned to a cupola furnace.

We claim:

1. A hydrometallurgical process for the separation and enrichment of gold, platinum and palladium and for the recovery of selenium from the anode sludge of cooper electrolysis which contains in addition to Au, Pt and Pd, Ag, Se and Te and which also contains Sb, Sn, As, Bi, Cu, Ni, Zn, Fe, sulfate, chloride, $BaSO_4$, and $SiO_2$, said process comprising the steps of:
   (a) chlorinating said sludge with $Cl_2$/HCl to solubilize in an aqueous phase thereof substantially all of the gold, platinum, palladium and selenium of said sludge, and filtering the aqueous phase from silver-chloride containing solids of said sludge to recover a first filtrate therefrom;
   (b) reacting said filtrate with an excess of chlorine gas at room temperature to transform the selenium solubilized in said filtrate as $Se^{+4}$ completely of $Se^{+6}$ and tellurium in the filtrate as $Te^{+4}$ to $Te^{+6}$;
   (c) treating the filtrate resulting from step (b) with a reducing agent capable of precipitating out gold quantitatively and in the presence of an amount of $Se^{+4}$ quantitatively precipitating out platinum, palladium also being precipitated out by said reducing agent, said reducing agent being selected from the group which consists of monovalent copper ion, a compound capable of forming monovalent copper ion, and copper and bronze dust;
   (d) filtering the precipitate resulting in step (c) from a second filtrate containing at least the major part of the selenium of said first filtrate;
   (e) heating the second filtrate in the presence of HCl and reacting said second filtrate with a reducing agent to quantitatively precipitate selenium, said reducing agent being selected from the group which consists of monovalent copper ion, a compound capable of forming monovalent copper ion, and copper and bronze dust; and
   (f) filtering the selenium-containing precipitate from the second filtrate reacted in step (e).

2. The process defined in claim 1 wherein in step (c), after gold has been precipitated out by the addition of the reducing agent of step (c) to the filtrate resulting from step (b), the $Se^{+4}$ is added and an additional quantity of the reducing agent of step (c) is added to precipitate out the platinum group metals with selenium metal, so that the precipitate from step (c) is a cementate.

3. The process defined in claim 1 wherein the second filtrate has a HCl concentration in excess of 40 g/l upon the heating in step (e) and is heated to a temperature of 70° C.

4. The process defined in claim 1 wherein the precipitate in step (e) is black crystalline selenium.

5. The process defined in claim 1 wherein the reducing agent used in step (c) is the same reducing agent as is used in step (e).

6. The process defined in claim 1 wherein the reducing agent used in step (c) is $Cu^{+1}$ or a substance capable of producing $Cu^{+1}$ ions in aqueous acid solution.

7. The process defined in claim 6 wherein said reducing agent is copper dust or bronze dust.

8. The process defined in claim 1 wherein the reducing agent used in step (e) is a $Cu^{+1}$ or a substance capable of producing $Cu^{+1}$ ions in aqueous acid solution.

9. The process defined in claim 8 wherein said reducing agent is copper dust or bronze dust.

* * * * *